United States Patent
Demaison et al.

(10) Patent No.: US 12,163,857 B2
(45) Date of Patent: Dec. 10, 2024

(54) METHOD FOR ACQUIRING DATA FOR DETECTING DAMAGE TO A BEARING

(71) Applicant: SAFRAN AIRCRAFT ENGINES, Paris (FR)

(72) Inventors: François Maurice Marcel Demaison, Moissy-Cramayel (FR); Jean-Robert André Fernand Pougeon, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 335 days.

(21) Appl. No.: 17/596,580

(22) PCT Filed: Jun. 18, 2020

(86) PCT No.: PCT/FR2020/051064
§ 371 (c)(1),
(2) Date: Dec. 14, 2021

(87) PCT Pub. No.: WO2020/260807
PCT Pub. Date: Dec. 30, 2020

(65) Prior Publication Data
US 2022/0163425 A1  May 26, 2022

(30) Foreign Application Priority Data
Jun. 27, 2019 (FR) ...................... 1907008

(51) Int. Cl.
*G01M 13/045* (2019.01)
*G01H 1/00* (2006.01)

(52) U.S. Cl.
CPC .......... *G01M 13/045* (2013.01); *G01H 1/003* (2013.01); *G06F 2218/02* (2023.01); *G06F 2218/10* (2023.01)

(58) Field of Classification Search
None
See application file for complete search history.

(56) References Cited

U.S. PATENT DOCUMENTS

| | | | |
|---|---|---|---|
| 2003/0061008 A1* | 3/2003 | Smith, Jr. | ........... G05B 23/0283 702/188 |
| 2005/0261876 A1 | 11/2005 | Orkisz | |

(Continued)

FOREIGN PATENT DOCUMENTS

| | | |
|---|---|---|
| AU | 2015201595 A1 | 10/2016 |
| CN | 1926413 A | 3/2007 |

(Continued)

OTHER PUBLICATIONS

French Search Report issued in FR1907008 on Mar. 11, 2020 (2 pages).

(Continued)

*Primary Examiner* — Lisa M Caputo
*Assistant Examiner* — Cynthia L Davis
(74) *Attorney, Agent, or Firm* — Bookoff McAndrews, PLLC

(57) ABSTRACT

Method for acquiring data for detecting damage to a bearing, comprising the following steps: obtaining a vibration signal from the bearing over a period of time, determining spectrograms of said vibration signal at various instants of the period of time, detecting the peaks on each spectrogram, from among the detected peaks, retaining the peaks which, in spectrograms corresponding to successive instants and transformed through synchronous resampling at a rotational speed of the bearing, would be present at the same frequency, with a predetermined tolerance, identifying spectral lines corresponding to the retained peaks, and storing information representative of said spectral lines in a record able to be used by a unit for detecting damage to the bearing.

16 Claims, 3 Drawing Sheets

(56) References Cited

U.S. PATENT DOCUMENTS

| | | |
|---|---|---|
| 2012/0272736 A1 | 11/2012 | Griffaton |
| 2017/0108406 A1 | 4/2017 | Thomson |
| 2018/0172743 A1 | 6/2018 | Hempl |
| 2019/0147626 A1* | 5/2019 | Gebbie .................... G06T 9/00 |
| | | 382/232 |
| 2019/0378305 A1* | 12/2019 | Fitzgerald ................ G06T 9/00 |

FOREIGN PATENT DOCUMENTS

| | | |
|---|---|---|
| CN | 101266197 A | 9/2008 |
| CN | 102597735 A | 7/2012 |
| CN | 107036815 A | 8/2017 |
| CN | 108776263 A | 11/2018 |
| EP | 2837919 A2 | 2/2015 |
| FR | 2952177 A1 | 5/2011 |
| FR | 3014502 A1 | 6/2015 |
| JP | 2006113002 A | 4/2006 |
| WO | 9919698 A1 | 4/1999 |

OTHER PUBLICATIONS

International Search Report issued in PCT/FR2020/051064 on Sep. 23, 2021 with English translation (4 pages).
Examination Report issued in corresponding Indian Application No. 202117058926, issued Jun. 7, 2024.
First Search issued in corresponding Chinese Application No. 20208043717.8, issued Apr. 29, 2023.
Supplemental Search issued in corresponding Chinese Application No. 20208043717.8, issued Apr. 29, 2024.

* cited by examiner

[Fig. 1]
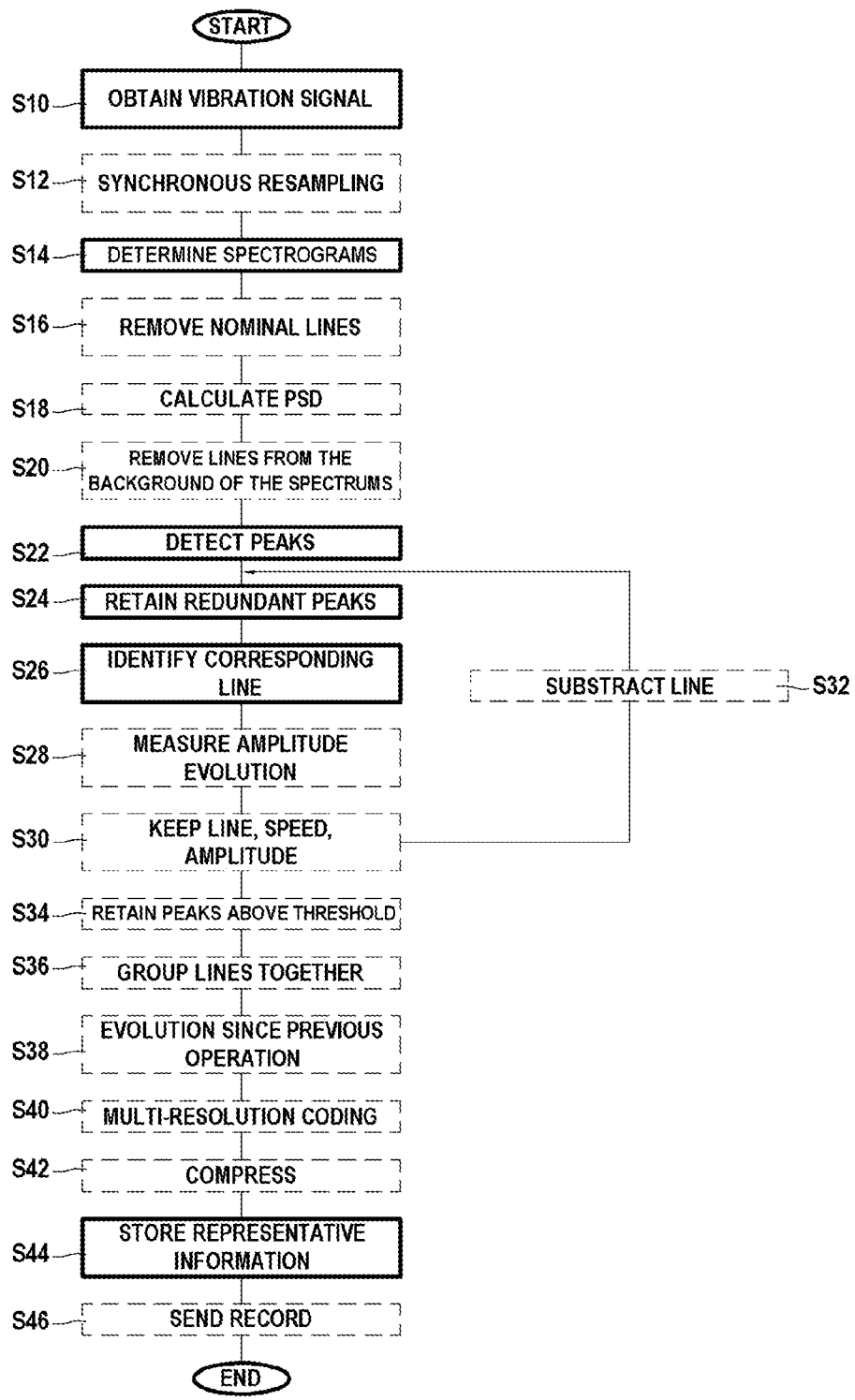

[Fig. 2]
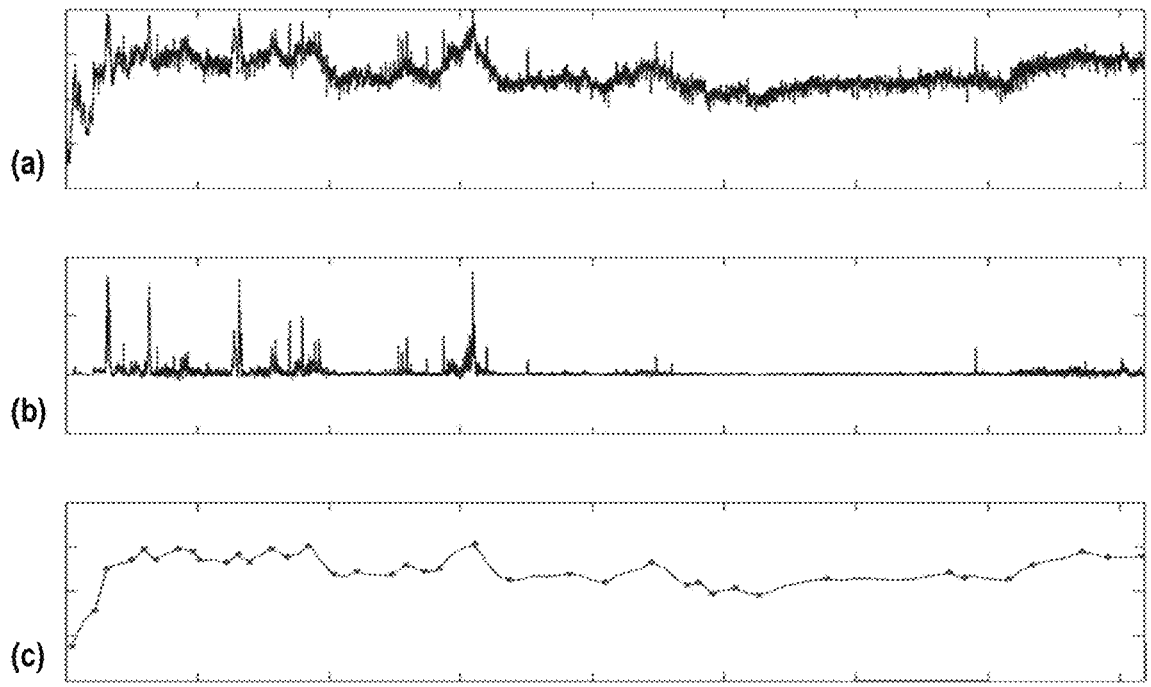
[Fig. 3]
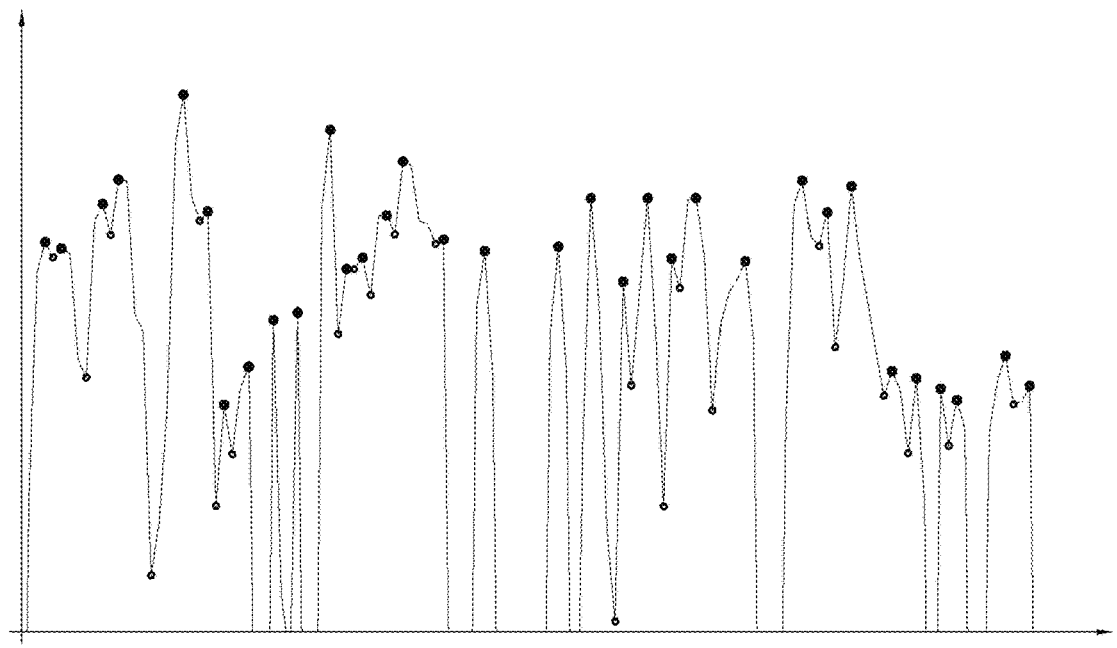

[Fig. 4]
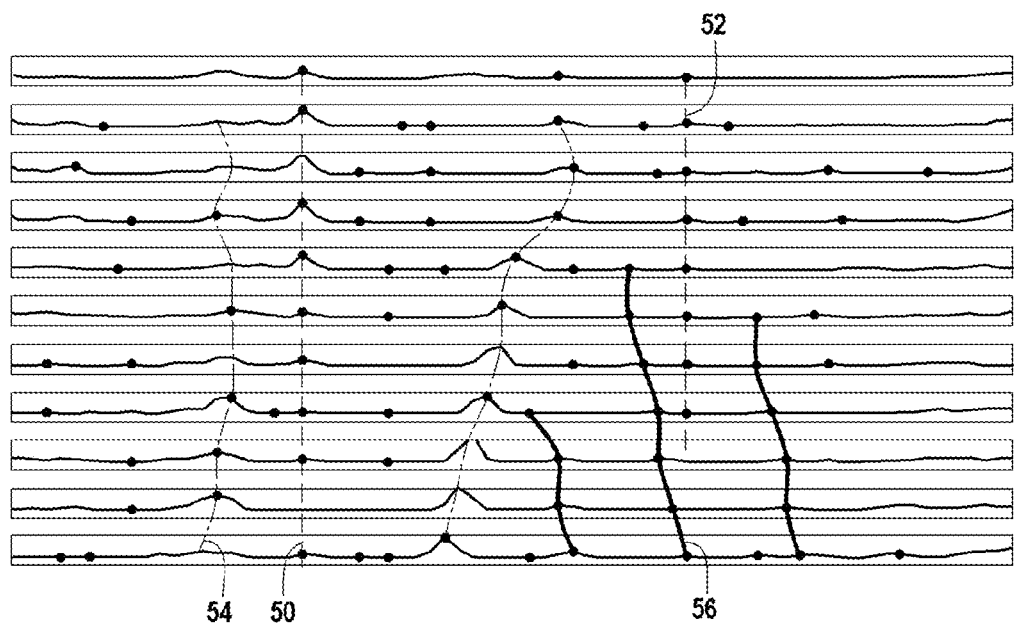
[Fig. 5]
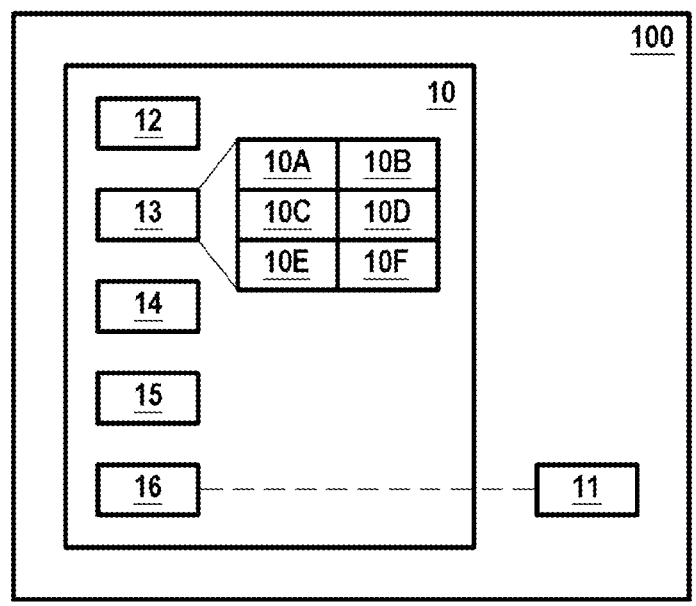

METHOD FOR ACQUIRING DATA FOR DETECTING DAMAGE TO A BEARING

CROSS-REFERENCE TO RELATED APPLICATION(S)

This patent application is the U.S. National Stage entry under 35 U.S.C. § 371 of International Patent Application No. PCT/FR2020/051064, filed on Jun. 18, 2020, which claims the benefit of priority to French Patent Application No. 1907008, filed on Jun. 27, 2019.

TECHNICAL FIELD

This disclosure relates to the field of component monitoring and fault detection. The present disclosure relates more specifically to a method for acquiring data for the detection of damage to a bearing. Such a method finds its applications on rotating machines, for example turbomachines used on aircraft.

TECHNOLOGICAL BACKGROUND

The monitoring of the components of an aircraft turbomachine generally requires a part on board the turbomachine, which acquires signals emanating from the components to be monitored and extracts relevant data from these signals, and a part on the ground, which processes this data to achieve a diagnosis of the concerned components. To perform a diagnosis in real time, the data extracted by the on-board part is directly transmitted to the ground part. Reducing the volume of data transmitted is therefore a constant concern.

As part of the detection of damage to a bearing, reducing the volume of data transmitted nevertheless implies that the on-board part must perform numerous data preprocessing operations. Currently, a large part of the diagnosis is therefore carried out on the on-board part. This has several disadvantages: the development costs are high to optimize the on-board part, the constraints related to the fact of being on-board hamper the algorithmic capacity of fault identification, it is necessary to ensure at all times consistency between the on-board part and the ground part, etc.

Patent application FR 2 952 177 A1, by the Applicant, describes a method for detecting damage to a bearing roller. Although this method is satisfactory, there is room for improvement to overcome at least in part the disadvantages mentioned above.

PRESENTATION OF THE INVENTION

To this end, this disclosure relates to a method for acquiring data for detecting damage to a bearing, comprising the following steps:

(a) obtaining a vibration signal from the bearing over a period of time;
(b) determining spectrograms of said vibration signal at various instants of the period of time;
(c) detecting the peaks on each spectrogram;
(d) from among the detected peaks, retaining the peaks which, in spectrograms corresponding to successive instants and transformed through synchronous resampling at a rotational speed of the bearing, would be present at the same frequency, with a predetermined tolerance;
(e) identifying spectral lines corresponding to the retained peaks;
(f) storing an information item representative of said spectral lines in a record able to be used by a unit for detecting damage to the bearing.

This method allows to acquire data, typically in flight, and prepare them in the form of a record to be transmitted to a detection unit, typically placed on the ground.

The bearing may be a turbomachine bearing, for example a roller such as a roller rotatably supporting at least one rotary shaft. The bearing can support, more generally, any rotating component.

The vibration signal reflects the evolution of a quantity representative in particular of the vibrations of the bearing, for example acceleration, as a function of time. It is therefore a temporal signal. The vibration signal can be acquired during the method or previously recorded and recovered by the method during step (a).

The period of time is a period of time during which the bearing operates, or even during which the rotational speed of the bearing may vary.

A spectrogram represents the amplitude of a signal as a function of frequency. It is a transformation of the vibration signal at a given instant.

A spectrogram can be obtained by Fourier transformation of the vibration signal or by other transformations known to the person skilled in the art, for example by wavelets or calculation of power spectral density (PSD).

The detected peaks can be local extrema, in particular local maxima and/or local minima.

Synchronous resampling is a technique known to the person skilled in the art, which aims at transforming data (a signal) in order to eliminate the influence of the rotational speed of the bearing therefrom. This technique is for example described in the aforementioned patent application FR 2 952 177 A1.

In step (d), from among the previously detected peaks, are retained those which, in spectrograms corresponding to successive instants and transformed through synchronous resampling at a rotational speed of the bearing, are present at the same frequency as the case may be, knowing that it is possible not to find peaks meeting this condition. This step can include the synchronous resampling of said spectrograms, then the detection of peak alignments at the same frequency. Alternatively, the alignment of peaks at the same frequency, also called peak redundancy, can be detected by other methods, such as image processing methods, which do not require the synchronous resampling to be explicitly performed. In all cases, the retained peaks are characterized by the fact that they would be aligned, that is to say present at the same frequency, if the synchronous resampling was carried out.

The tolerance used to detect this presence can be a tolerance in frequency and/or in amplitude. Alternatively or in addition, tolerance can consist in accepting the absence of a peak at one or more instants in a series of spectrograms in which the peak is otherwise mostly present.

For step (d), for example, spectrograms corresponding to at least two, preferably three, four, five or more successive instants, are considered.

A spectral line, or more simply line, is a spectrogram line. The spectral lines identified in step (e) can be the lines of each of the spectrograms (resampled or not) determined in step (b), but also, alternatively or in addition, lines of an average spectrogram cumulating the information items from said spectrograms. For example, if the spectrograms of step (b) are obtained by Fourier transform, the lines of step (e) can be lines of the PSD calculated from the average of the Fourier transforms. Thus, it is possible to identify a unique line for each concerned frequency, independently of the instants of the period of time for which the Fourier transforms were determined.

Step (e) mentions the term "lines" in the plural, generically, but it goes without saying that this expression also includes the singular.

The representative information item stored in the record may be a description of the spectral lines themselves, for example their frequency and/or amplitude, or any information item that allows the identified lines to be described, within a certain precision. The precision depends on the information loss rate accepted for the acquisition method.

Thanks to the proposed acquisition method, the record contains relatively little data, therefore it is easy to be sent to a unit for detecting damage to the bearing that is on the ground. In addition, the analysis of the redundancy of the peaks in the successive spectrograms allows to distinguish the lines due to mechanical phenomena from noise. Thus, the acquisition method operates an efficient selection of the relevant information, without presupposing the location of the lines of interest to diagnose damage to the bearing.

In some embodiments, the acquisition method comprises, before storing the information item representative of the spectral lines in step (f), encoding a characteristic of the spectral lines with a different precision depending on whether the value of this characteristic is low or high, and including this encoded characteristic in said representative information item. This difference in precision is sometimes called "multi-resolution". The characteristic concerned can be the amplitude, the frequency or any other quantity representative of the latter. Thus, for example, the amplitude of relatively low amplitude spectral lines is encoded with a different precision than the amplitude of relatively high amplitude spectral lines. Typically, better precision can be provided for the low amplitude lines than for the high amplitude lines. Multi-resolution encoding can be obtained by applying, to the characteristic of each line, a function which expands the areas where better precision is desired and contracts the areas where it is possible to be satisfied with poorer precision. The function can be a nonlinear transformation, for example a logarithm.

In some embodiments, the spectral lines corresponding to a nominal operation of the bearing are ignored. Indeed, the record aiming at detecting damage, it is not useful to include lines corresponding to a nominal operation of the bearing therein. These lines can be ignored in several ways, for example by subtracting them from the spectrograms, by not retaining the corresponding peaks, or by not entering them in the record when the lines are identified. This results in a saving of calculation time, a saving of space in the record and possibly a simplification of the identification of the relevant lines. The nominal lines can be known beforehand, by means of real tests, calculations or simulations, and prerecorded.

In the technical field under consideration, sometimes cleaned data are considered, as opposed to complete data, to designate data from which the spectral lines which are always present during nominal operation of the bearing have been removed. These lines could indeed mask other potential lines to be extracted.

In some embodiments, the spectral lines identified in step (e) are subtracted from the spectrograms, and steps (d) and (e) are repeated. In other words, steps (d) and (e) can be performed iteratively, each time subtracting the identified spectral lines, to facilitate the detection of peaks that may be less visible. This repetition can be carried out until no more peaks satisfying the search conditions, that is to say the aforementioned tolerance, are retained. At least the last occurrence of steps (d) and (e), or even each occurrence, is followed directly or indirectly by step (f) so as to store an information item representative of the lines identified in the record.

In some embodiments, after repeating steps (d) and (e), the remaining peaks whose amplitude is greater than a predetermined threshold are retained, and the corresponding spectral lines are identified. Indeed, after steps (d) and (e), the information item remaining in the spectrograms is either noise or complex relevant information. In order to limit the loss of useful information, the remaining peaks whose amplitude is greater than a predetermined threshold, are retained. In step (f), an information item representative of the corresponding lines can be stored in the record. Thus, despite the possible complexity of the mechanical phenomenon that gave rise to these peaks, they can be the subject of a complete analysis on the ground. Therefore, in these embodiments, the method also takes into consideration the complex factors of damage to the bearing.

In some embodiments, the representative information item comprises the evolution of the amplitude of the spectral line as a function of the rotational speed of the bearing. This evolution can be understood for at least one line, for at least a majority of lines or for each line. The evolution of the amplitude of a line can be determined simply from the spectrograms corresponding to the successive instants, and including this information item in the record is useful for the diagnosis of damage. It is understood, in these embodiments, that the speed of the bearing varies during the considered period of time.

In some embodiments, the representative information item comprises groups including a first information item corresponding to a reference spectral line and one or more second information items each corresponding to a secondary spectral line relative to the reference spectral line. In order to further reduce the size of the record and thus optimize its sending, it is possible to group the lines together, for example by harmonics, in order to avoid including the position information item of each line individually. A first line is identified as a reference spectral line and the information item relating thereto is an information item of a first type (first information item), for example sufficient by itself to identify the reference line. The following lines are taken into account in the record thanks to an information item of a second type (second information item), each second information item being ideally less voluminous than the first information item, and defining each of these lines relative to the reference line. It is sometimes said that spectral lines are grouped together in combs, due to the visual resemblance between a comb and a multitude of lines.

In some embodiments, the representative information item comprises, for each spectral line already known during a previous operation of the bearing, only an amplitude indicator, and for each spectral line not known during a previous operation of the bearing, at least the frequency of the spectral line. In this way, it is possible to further decrease the size of the record, the full characterization of the lines can be rebuilt based on a known previous operation of the bearing and on this record, in which each representative information item comprises, if possible, only the amplitude deviation of a line between the previous operation and the present operation. The representative information item may be a complete information item for previously unknown spectral lines.

In some embodiments, before being stored, the representative information item is encoded by means of a codebook pre-established before the implementation of said acquisition method. Pre-established means that the codebook is established on the basis of prior tests or simulations. As this codebook is known and does not depend on the execution of the method, it is not necessary to calculate it each time or to transmit it, which further reduces the volume of data exchanged between the on-board part and the ground part.

This disclosure also relates to a data acquisition unit for detecting damage to a bearing, in particular for a turbomachine, the acquisition unit comprising
(a) a module for obtaining a vibration signal from the bearing over a period of time;
(b) a module for determining spectrograms of said vibration signal at various instants of the period of time;
(c) a module for detecting the peaks on each spectrogram;
(d) a selection module configured, from among the peaks detected by the detection module, to retain the peaks which, in spectrograms corresponding to successive instants and transformed through synchronous resampling at a rotational speed of the bearing, would be present at the same frequency, with a predetermined tolerance;
(e) a module for identifying spectral lines corresponding to the retained peaks;
(f) a storage module, configured to store an information item representative of said spectral lines in a record able to be used by a unit for detecting damage to the bearing.

The data acquisition unit can be configured to implement all or part of the characteristics of the method for acquiring data described above.

This disclosure also relates to a turbomachine, in particular an aircraft turbomachine, comprising a bearing, an acquisition unit as described above and a communication unit configured to send the record to a remote unit for detecting damage to the bearing.

In a particular embodiment, the various steps of the data acquisition method are determined by computer program instructions.

Consequently, the present disclosure is also directed to a program on an information medium, this program being capable of being implemented in an acquisition device or more generally in a computer, this program including instructions adapted to the implementation of the steps of a data acquisition method as described above.

This program can use any programming language, and be in the form of source code, object code, or intermediate code between source code and object code, such as in a partially compiled form, or in any other desirable form.

The present disclosure also relates to an information medium readable by a computer or by a microprocessor, and including instructions of a program as mentioned above.

The information medium can be any entity or device capable of storing the program. For example, the medium may include a storage means, such as a ROM, for example a CD ROM or a microelectronic circuit ROM, or else a magnetic recording means, for example a floppy disk or a hard disk.

On the other hand, the information medium can be a transmissible medium such as an electrical or optical signal, which can be conveyed via an electrical or optical cable, by radio or by other means. The program according to the present disclosure can in particular be downloaded from an Internet type network.

BRIEF DESCRIPTION OF THE DRAWINGS

The invention and its advantages will be better understood upon reading the following detailed description of embodiments given by way of non-limiting examples. This description refers to the appended drawings, in which:

FIG. 1 is a diagram illustrating a method for acquiring data according to one embodiment.

FIG. 2 illustrates the separation of the lines from the background of the spectrum according to one embodiment.

FIG. 3 illustrates the detection of peaks according to one embodiment.

FIG. 4 illustrates retaining some of the detected peaks according to one embodiment.

FIG. 5 is a diagram schematically showing a turbomachine comprising a data acquisition unit.

DESCRIPTION OF EMBODIMENTS

FIG. 1 illustrates a method for acquiring data according to one embodiment. This method can be used in the detection of damage to a bearing. Globally, the principle of detection is to highlight the damage to a bearing by measuring the influence that this damage has on the vibrations of a rotating element of the turbomachine, some frequencies being able to be more or less complexly related to certain types of damage. The method of FIG. 1 allows more specifically to acquire the relevant vibration data which can then be used to assess the damage to the bearing.

To this end, the method comprises a step S10 during which a vibration signal is acquired over a period of time. The vibration signal can translate the vibrations of the bearing or of a rotating element which is rotatably integral with a part of the bearing. The vibration signal can be acquired for example by means of an accelerometer, a strain gauge or any adapted sensor.

The bearing can also be equipped with one or more tachometers for measuring the rotational speed, also called speed, of the rotating elements, in particular of said bearing. These speed and vibration sensors can be connected to a computer which acquires the signals and then transmits them, preferably digitally, to a computing unit.

The rest of the method can be applied for each vibration signal, typically originating from each accelerometer. Without loss of generality, only the processing of a vibration signal will be detailed below.

In optional step S12, synchronous resampling of the vibration signal is carried out. As the frequencies to be monitored to detect damage to the bearing depend on the different rotational speeds, it is useful, in order to simplify its processing, to resample the vibration signal synchronously at the involved rotational speeds, which may include the speeds directly measured by the tachometers but also any linear combination of these speeds: for example, for an inter-shaft bearing, the rotation speed of the bearing will be the sum or the difference of the speed of the two shafts relative to a part of the turbomachine considered as stationary.

Synchronous resampling, known per se and described for example in the aforementioned publication FR 2 952 177 A1, allows to eliminate the influence of the rotational speed. It is therefore possible to perform a synchronous resampling of the same vibration signal for each rotational speed, that is to say relative to each kinematically independent rotating component, in order to selectively eliminate the influence of a particular rotation.

As indicated previously, spectrograms of said vibration signal are then determined at various instants of the period of time (step S14). In this case, spectrograms are determined for each resampled vibration signal. For example, Fourier transforms of the vibration signal can be calculated, optionally by means of techniques known per se.

In optional step S16, the lines corresponding to nominal operation of the bearing are removed from the spectrograms. Indeed, these lines could complicate the detection of some relevant vibration lines. Furthermore, it is not relevant to transmit them to diagnose the damage, since these lines are associated with normal operation of the undamaged bearing. Removing these lines directly in the spectrograms, before processing, allows to lighten the following processing operations. However, as indicated above, this is only one example of the more general case of ignoring the spectral lines corresponding to nominal operation of the bearing.

In optional step S18, a PSD of the vibration signal is calculated. The calculation of the PSD can use a method known per se, for example the Welsch method which uses the Fourier transforms calculated at various instants, which in this case have already been calculated in step S14: these are the spectrograms. The PSD provides a spectrum with reduced noise, this spectrum being an average spectrum over the considered period of time.

In optional step S20, for each spectrogram, the lines of the spectrum background are separated. The lines are the jagged evolutions of the spectrogram (large variations), while the spectrum background represents the background evolution of the signal (small variations). The determination of a delimitation between the lines and the background of the spectrum is within the abilities of the person skilled in the art. Separating the lines from the background of the spectrum allows to compress the data resulting from each of these elements more efficiently.

FIG. 2 illustrates this step by means of different graphs showing the amplitude of vibrations as a function of frequency: graph (a) represents the logarithm to the base 10 of the spectrogram, graph (b) represents the lines extracted from graph (a) and graph (c) represents the logarithm to the base 10 of the background of the spectrum. Each graph illustrates the amplitude of the signal as a function of frequency. As can be seen in graph (c), the background of the spectrum is information with low variability which can be approximated efficiently by a few points along the curve. These points can be processed and transmitted separately. The remainder of the method of FIG. 1 applies to the extracted lines illustrated in graph (b).

Alternatively, it would be possible not to differentiate the lines from the background of the spectrum at this stage, although this complicates the detection of the peaks which takes place in the next step.

In step S22, indeed, the peaks are detected on each spectrogram. As indicated above, the term "peaks" is generic and refers to both high peaks (tops) and low peaks (valleys), that is to say local maxima and local minima. It is of course possible to detect only local maxima, only local minima, or both.

FIG. 3 illustrates this step. The curve represents the amplitude of the spectrogram as a function of the frequency. The local peaks or extrema are identified, on this curve, by small circles, respectively filled circles for the peaks and empty circles for the valleys. The detection of peaks in a curve is, per se, known to the person skilled in the art. This peak detection allows the items of relevant information to be extracted from the spectrogram, the peaks in one direction or the other allowing to distinguish data due to damage to the bearing on the one hand and noise on the other hand.

The principle of the next step S24 is to retain, from among the previously detected peaks, those which have regularity or redundancy over time. For this purpose, in the present embodiment, the spectrograms corresponding to successive instants and transformed through synchronous resampling as explained above are superimposed. This superposition is illustrated in FIG. 4, which shows eleven spectrograms taken at eleven successive instants from top to bottom. These spectrograms are disposed so that their abscissa axes, indicating the frequency, are common.

The spectrograms in question can, for example, be the Fourier transforms calculated previously, or else intermediate PSDs, that is to say PSDs calculated from said Fourier transforms over a sub-period of the total period of time. Such a grouping allows to reduce the number of spectrograms and therefore to lighten the computational load.

As can be seen from FIG. 4, some peaks are present at the same frequency, with a predetermined tolerance, on several successive spectrograms. In FIG. 4, these peaks were identified by virtue of vertical dashes 50, 52, which materialize the fact that the frequency of these peaks, after synchronous resampling, is substantially the same. Thus, it is also referred to as peak alignment. The predetermined tolerance mentioned above can relate to the position of the peak but also to its presence, missing occurrences of peaks being able to be tolerated (see for example dash 50, second spectrogram from the bottom). The tolerance criteria can be adjusted by the person skilled in the art depending on the precision and the compression rate desired for the method.

In FIG. 4, other curves 54, 56 illustrate the persistence of other peaks over time; these peaks would be present at the same frequency ("aligned") if the spectrograms were resampled synchronously with another rotational speed. The identification of these peaks can be done explicitly by superimposing the resampled spectrograms synchronously with another speed, as detailed previously with regard to an example of a rotational speed, but can also be done without explicitly performing this detection of alignment and ad hoc resampling, for example using image processing algorithms.

Thus, whether the synchronous resampling is done explicitly or not, those of the detected peaks which, in spectrograms corresponding to successive instants and transformed through synchronous resampling at a rotational speed of the bearing, would be present at the same frequency, are retained, with a predetermined tolerance.

Then, in step S26, for each series of retained peaks, the spectral line corresponding to these peaks is identified. The spectral line can be the line of the PSD which has the same frequency as the retained peaks. This line is characterized by its frequency, its amplitude, but also the accelerometer from which it originates and the rotational speed for which the peaks are aligned.

Optionally, in step S28, one determines the evolution of the amplitude of the spectral line as a function of time, and therefore of the rotational speed of the bearing which, in this embodiment, varies in the considered period of time. Indeed, the spectral lines are present in certain speed ranges. Consequently, according to the evolution of the rotational speed of the bearing, the amplitude of certain lines increases (for example the lines corresponding to the curve 54 in FIG. 4) while the amplitude of others decreases (for example the lines corresponding to the curves 50, 52 in FIG. 4). Generally, the lines which evolve differently are not related to the same phenomenon. Thus, the fact that the information item representative of the lines (see below) comprises the evolution of the amplitude of the line as a function of the rotational speed of the bearing is interesting for diagnosing the damage to the bearing. It should be noted that this evolution can be stored in a more or less precise and detailed manner, ranging for example from the simple direction of variation to quantified information. According to one example, the evolution can be obtained by regression from the spectrograms.

In step S30, the data acquired so far, namely the spectrograms, the lines, the corresponding speeds, the amplitudes, the evolutions, etc. are kept for further processing. The detection of other peaks and therefore potentially other lines can be carried out by repeating steps S24 and S26, optionally combined with step S28, as shown in the loop of FIG. 1.

During this loop, in order to facilitate the detection of other peaks, the spectral lines identified at this stage can, optionally, be subtracted from the spectrograms (step S32). For example, if it is desired to subtract a line corresponding to a top (high peak), it is possible to replace the top by an interpolation between the valleys (low peaks) directly framing this top. According to another example, each amplitude between the two valleys framing the top of a spectrogram is replaced by interpolation with the corresponding frequencies of the spectrogram corresponding to the previous instant and of the spectrogram corresponding to the following instant.

After these steps, the information item not extracted from the spectrograms is either noise or an information item that has not been detected due to its complex structure. Optionally, in order to limit the risk of loss of useful information item, in step S34, the remaining peaks whose amplitude is greater than a predetermined threshold are retained, and the corresponding spectral lines are identified. This threshold can be either fixed, for example determined according to the desired compression rate, or dynamic, for example determined according to the amount of data already identified as relevant (the retained spectral lines) and to the maximum size desired for the final record.

It is considered, at this point, that the relevant information item has been extracted from the vibration signal. In order to reduce the size of the information item to be stored in the record, one or more processing operations, which are optional and independent of each other, can be carried out.

According to a first processing, the identified spectral lines can be grouped together (step S36). In particular, each group of lines can comprise a first information item corresponding to a reference spectral line and one or more second information items each corresponding to a secondary spectral line relative to the reference spectral line. The second information items are less voluminous than the first information item but are sufficient to completely identify each secondary spectral line from the reference spectral line.

For example, the starting point is an identified line of higher frequency, and its frequency is divided by integer numbers. If the frequencies obtained correspond to one or more other retained lines, possibly with a certain tolerance, then all these lines can be regrouped: "combs" including a fundamental line, or more generally reference line, and one or more harmonics, or more generally secondary lines are thus reconstructed. The groups or combs can be ordered according to their size or according to the dividers used, in order to avoid encoding, for each comb, the type of comb.

According to a second processing, in step S38, to further reduce the size of the data to be stored in the record, in this case to avoid storing each time the position (that is to say the frequency) of each spectral line, it is possible to compare the identified lines with the spectral data of a previous operation taken under the same speed conditions. Thus, the representative information item comprises, for each spectral line already known during a previous operation of the bearing, only an amplitude indicator, for example the amplitude or the amplitude deviation relative to the previous operation.

For each spectral line not known during a previous operation of the bearing, the representative information item can comprise at least the frequency of said spectral line, and preferably also its amplitude.

It is possible to combine the different approaches proposed here and, for example, to send the frequency and the position of all the lines (that is to say without step S38) for a certain speed and to send only an amplitude indicator (that is to say with step S38) for the other speeds. Alternation is performed from one operation to the next so that a reference spectrum (without step S38) is sent regularly for each speed, while maintaining an acceptable size on all the data.

According to a third processing, in step S40, a characteristic of the spectral lines is encoded with a different precision depending on whether the value of this characteristic is low or high. In this case, this step is carried out by applying a logarithm, for example as a logarithm to the base 10. Any other logarithm would be suitable. The person skilled in the art can also choose another nonlinear function which shrinks the ranges requiring low precision and expands the ranges requiring better precision. Thus, the characteristic, for example here the amplitude or more generally the amplitude indicator, takes up less storage space. Furthermore, the decrease in resolution in certain ranges favors greater repetition of values, thus increasing the efficiency of the compression which will be described below.

According to a fourth processing, in step S42, the data can be compressed using compression algorithms known per se, for example an LZW type lossless compression algorithm. The codebook used in such algorithms can be pre-established, so there is no need to transmit it. Furthermore, this codebook may be line specific and different from the codebook used to compress the information item relating to the background of the spectrum.

These processing operations, whether they are applied or not, result in an information item which is representative of the spectral lines identified in step S26, or even in step S34, in the sense that it is possible to reconstruct said lines, at least with a certain tolerance, based on the representative information item.

This representative information item is stored, in step S44, in a record able to be used by a unit for detecting damage to the bearing.

Optionally, this record can be transmitted, in step S46, to a detection unit, typically a ground unit which will perform the damage diagnosis on the basis of the record, while all the processing described so far had been carried out by an on-board device. Alternatively, this record could be stored pending a return of the aircraft to the ground, and the stored record(s) would be unloaded once the aircraft is on the ground.

FIG. 5 schematically shows a turbomachine 100 comprising a data acquisition unit 10 for the detection of damage to a bearing. The data acquisition unit 10 here has the hardware architecture of a computer. It includes in particular a processor 12, a read only memory 13, a random access memory 14, a non-volatile memory 15 and means for communicating 16 with the accelerometer 11 allowing the data acquisition unit 10 to obtain the measurements taken by the accelerometer 11. The estimation device 10 and the accelerometer 11 are for example connected by a digital data bus or a serial (for example USB (Universal Serial Bus) interface) or wireless interface known per se.

The read only memory 13 of the estimation device 10 constitutes a recording medium in accordance with the present disclosure, readable by the processor 12 and on which is recorded a computer program in accordance with the present disclosure, including instructions for the execution of the steps of a method for acquiring data described previously with reference to FIGS. 1 to 4.

This computer program defines, in an equivalent manner, functional modules of the data acquisition unit 10 capable of implementing the steps of the data acquisition method. Thus, in particular, this computer program defines a module 10A for obtaining a vibration signal from the bearing over a period of time; a module 10B for determining spectrograms of said vibration signal at various instants of the period of time; a module 10C for detecting the peaks on each spectrogram; a selection module 10D configured, from among the peaks detected by the detection module, to retain the peaks which, in spectrograms corresponding to successive instants and transformed through synchronous resampling at a rotational speed of the bearing, would be present at the same frequency, with a predetermined tolerance; a module 10E for identifying spectral lines corresponding to the retained peaks; a storage module 10F, configured to store an information item representative of said spectral lines in a record able to be used by a unit for detecting damage to the bearing. The functions of these modules were described in more detail with reference to the steps of the data acquisition method.

Although the present description refers to specific exemplary embodiments, modifications can be made to these examples without departing from the general scope of the invention as defined by the claims. In particular, individual characteristics of the different illustrated/mentioned embodiments can be combined in additional embodiments. Consequently, the description and the drawings should be taken in an illustrative rather than a restrictive sense.

The invention claimed is:

1. A method for acquiring data for detecting damage to a bearing, comprising making one or more processors perform:
   a. obtaining a vibration signal from the bearing over a period of time;
   b. determining spectrograms of said vibration signal at various instants of the period of time;
   c. detecting peaks on each spectrogram;
   d. from among the detected peaks, retaining the peaks which, in spectrograms corresponding to successive instants and transformed through synchronous resampling at a rotational speed of the bearing, would be present at a same frequency, with a predetermined tolerance;
   e. identifying spectral lines corresponding to the retained peaks and subtracting the spectral lines from the spectrograms;
   repeating steps (d) and (e); and
   f. storing an information item representative of said spectral lines in a record able to be used by a unit for detecting damage to the bearing, wherein the record is stored at a data acquisition unit onboard an aircraft and wherein the record is transmitted to a detection unit on the ground for detecting damage to the bearing.

2. The acquisition method according to claim 1, comprising, before storing the information item representative of the spectral lines in step (f), encoding a characteristic of the spectral lines with a different precision depending on a magnitude of a value of this characteristic, and including this encoded characteristic in said representative information item.

3. The acquisition method according to claim 1, wherein the spectral lines corresponding to a nominal operation of the bearing are ignored.

4. The acquisition method according to claim 1, wherein, after repeating steps (d) and (e), the remaining peaks whose amplitude is greater than a predetermined threshold are retained, and the corresponding spectral lines are identified.

5. The acquisition method according to claim 1, wherein the representative information item comprises an evolution of an amplitude of the spectral line as a function of the rotational speed of the bearing.

6. The acquisition method according to claim 1, wherein the representative information item comprises groups including a first information item corresponding to a reference spectral line and one or more second information items each corresponding to a secondary spectral line relative to the reference spectral line.

7. The acquisition method according to claim 1, wherein the representative information item comprises, for each spectral line already known during a previous operation of the bearing, only an amplitude indicator, and for each spectral line not known during a previous operation of the bearing, at least the frequency of said spectral line.

8. The acquisition method according to claim 1, wherein, before being stored, the representative information item is encoded by means of a codebook pre-established before the implementation of said acquisition method.

9. A data acquisition unit for detecting damage to a bearing, in particular for a turbomachine, the data acquisition unit comprising one or more processors configured to:
   a. obtain a vibration signal from the bearing over a period of time;
   b. determine spectrograms of said vibration signal at various instants of the period of time;
   c. detect peaks on each spectrogram;
   d. from among the detected peaks, retain the peaks which, in spectrograms corresponding to successive instants and transformed through synchronous resampling at a rotational speed of the bearing, would be present at a same frequency, with a predetermined tolerance;
   e. identify spectral lines corresponding to the retained peaks and subtracting the spectral lines from the spectrograms;
   repeat steps (d) and (e); and
   f. store an information item representative of said spectral lines in a record able to be used by a unit for detecting damage to the bearing, wherein the record is stored at the data acquisition unit onboard an aircraft and wherein the record is transmitted to a detection unit on the ground for detecting damage to the bearing.

10. A method for acquiring data for detecting damage to a bearing, comprising making one or more processors perform:
    (a) obtaining a vibration signal from the bearing over a period of time;
    (b) determining spectrograms of said vibration signal at various instants of the period of time;
    (c) detecting peaks on each spectrogram;
    (d) from among the detected peaks, retaining the peaks which, in spectrograms corresponding to successive instants and transformed through synchronous resampling at a rotational speed of the bearing, would be present at a same frequency, with a predetermined tolerance;
    (e) identifying spectral lines corresponding to the retained peaks; and
    (f) storing an information item representative of said spectral lines in a record able to be used by a unit for detecting damage to the bearing, wherein the information item comprises, for each spectral line already known during a previous operation of the bearing, only an amplitude indicator, and for each spectral line not known during a previous operation of the bearing, at least the frequency of said spectral line, wherein the record is stored at a data acquisition unit onboard an aircraft and wherein the record is transmitted to a detection unit on the ground for detecting damage to the bearing.

11. The acquisition method according to claim 10, comprising, before storing the information item representative of the spectral lines in step (f), encoding a characteristic of the spectral lines with a different precision depending on a magnitude of a value of this characteristic, and including this encoded characteristic in said representative information item.

12. The acquisition method according to claim 10, wherein the spectral lines corresponding to a nominal operation of the bearing are ignored.

13. The acquisition method according to claim 10 wherein the spectral lines identified in step (e) are subtracted from the spectrograms, and steps (d) and (e) are repeated.

14. The acquisition method according to claim 13, wherein, after repeating steps (d) and (e), the remaining peaks whose amplitude is greater than a predetermined threshold are retained, and the corresponding spectral lines are identified.

15. The acquisition method according to claim 10, wherein the representative information item comprises an evolution of an amplitude of the spectral line as a function of the rotational speed of the bearing.

16. The acquisition method according to claim 10, wherein the representative information item comprises groups including a first information item corresponding to a reference spectral line and one or more second information items each corresponding to a secondary spectral line relative to the reference spectral line.

* * * * *